(12) United States Patent
Tracht

(10) Patent No.: US 7,290,794 B2
(45) Date of Patent: *Nov. 6, 2007

(54) VEHICLE SEAT COMPONENT SIDE AIR BAG MODULE HAVING AIR BAG GUIDE INCLUDING FLEXIBLE INNER AND OUTER PANELS ATTACHED TO FRAME

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 427 days.

This patent is subject to a terminal disclaimer.

(21) Appl. No.: 10/904,859

(22) Filed: Dec. 1, 2004

(65) Prior Publication Data

US 2006/0113756 A1 Jun. 1, 2006

(51) Int. Cl.
*B60R 21/16* (2006.01)
(52) U.S. Cl. .................. 280/730.2; 280/728.3
(58) Field of Classification Search ............. 280/730.1, 280/730.2, 728.3, 728.2, 743.1
See application file for complete search history.

(56) References Cited

U.S. PATENT DOCUMENTS

| | | | |
|---|---|---|---|
| 5,498,030 A | 3/1996 | Hill et al. | |
| 5,678,853 A | 10/1997 | Maly | |
| 5,749,597 A | 5/1998 | Saderholm | |
| 5,762,363 A | 6/1998 | Brown et al. | |
| 5,816,610 A | 10/1998 | Higashiura et al. | |
| 5,860,673 A | 1/1999 | Hasegawa et al. | |
| 5,863,063 A | 1/1999 | Harrell | |
| 5,927,749 A | 7/1999 | Homier et al. | |
| 5,938,232 A | 8/1999 | Kalandek et al. | |
| 5,967,603 A | 10/1999 | Genders et al. | |
| 5,988,674 A * | 11/1999 | Kimura et al. ............ | 280/730.2 |
| 6,045,151 A | 4/2000 | Wu | |
| 6,074,003 A * | 6/2000 | Umezawa et al. ....... | 297/216.1 |
| 6,237,934 B1 | 5/2001 | Harrell et al. | |
| 6,357,789 B1 | 3/2002 | Harada et al. | |
| 6,588,838 B1 | 7/2003 | Dick, Jr. et al. | |
| 2002/0063452 A1 | 5/2002 | Harada et al. | |

FOREIGN PATENT DOCUMENTS

EP 0 856 439 A1 8/1998

OTHER PUBLICATIONS

U.S. Appl. No. 08/808,572, filed Feb. 28, 1997, Wu et al.

* cited by examiner

*Primary Examiner*—Paul N. Dickson
*Assistant Examiner*—Tiffany L. Webb
(74) *Attorney, Agent, or Firm*—Brooks Kushman P.C.

(57) ABSTRACT

A vehicle seat component (18) includes a side air bag module (18) mounted on a frame (24) within a trim cover (34) that also covers a seat pad (30). An air bag guide (44) includes flexible inner and outer panels (46,48) that extend between a release seam (36) of the trim cover (34) and the air bag module (18) to provide a guiding function to an air bag (42) thereof as it is inflated upon deployment so as to project outwardly through the release seam (36) for use. Inner extremities (52,56) of the flexible inner and outer panels (46,48) are respectively secured by a first taut wire connector (64) and a second frame connector (66) at spaced locations from each other.

12 Claims, 4 Drawing Sheets

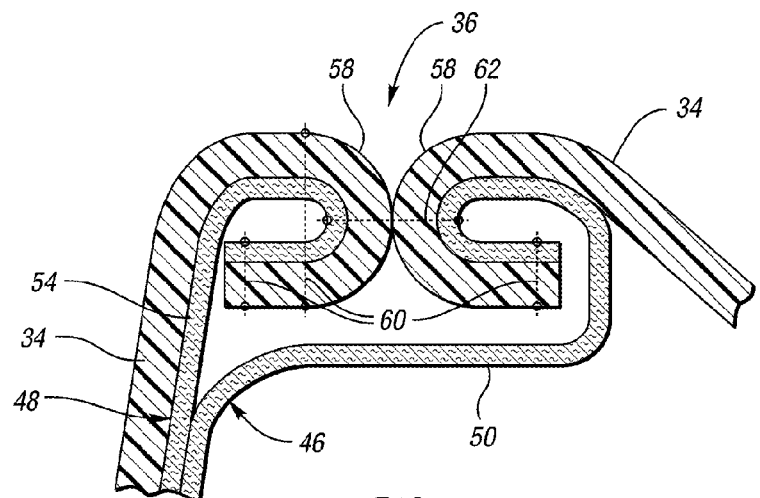
*Fig. 4*
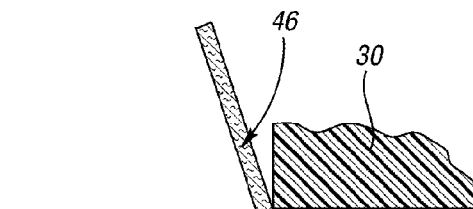
*Fig. 5*
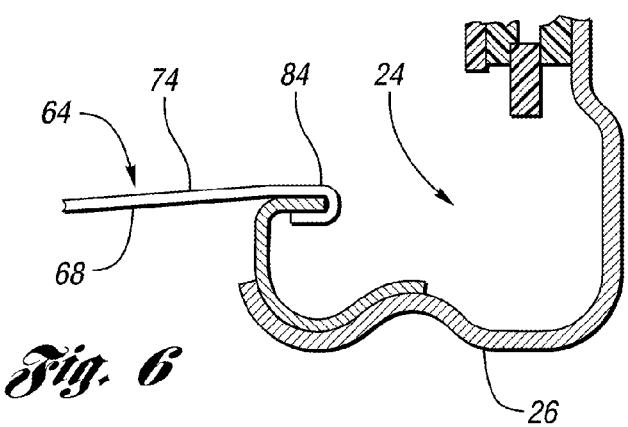
*Fig. 6*
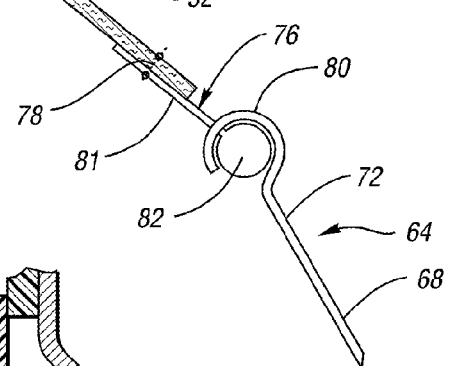

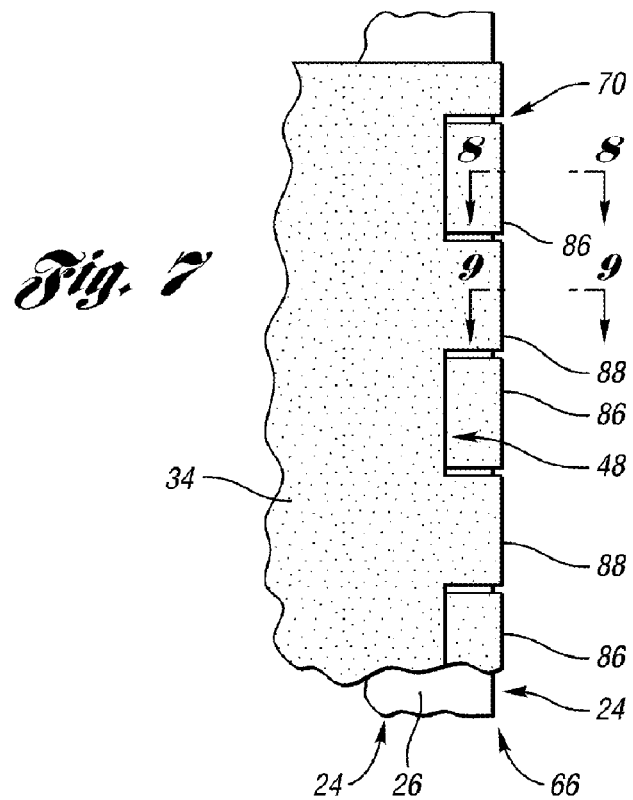
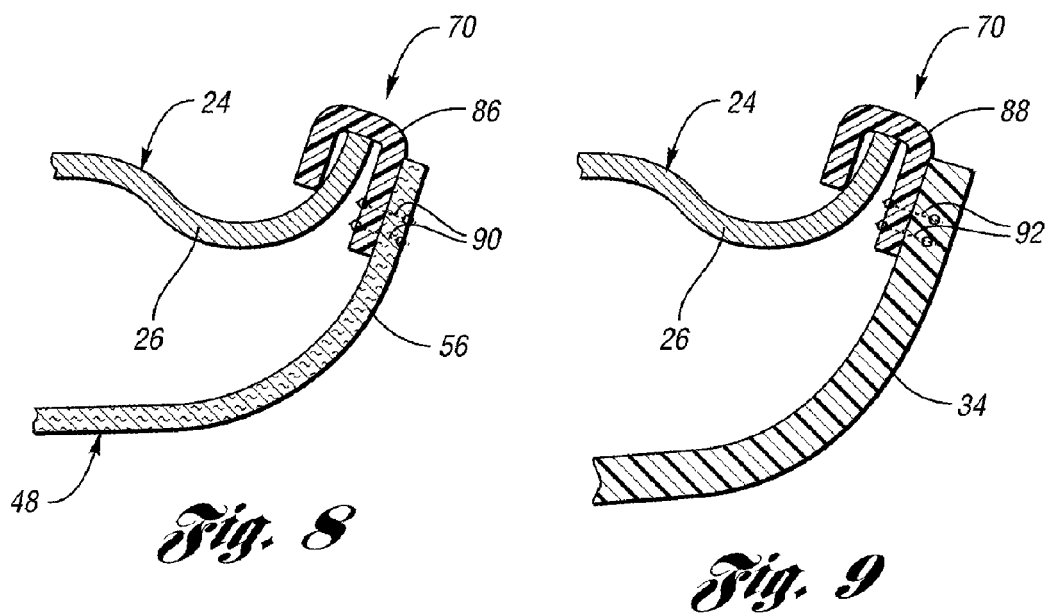

VEHICLE SEAT COMPONENT SIDE AIR BAG MODULE HAVING AIR BAG GUIDE INCLUDING FLEXIBLE INNER AND OUTER PANELS ATTACHED TO FRAME

BACKGROUND OF THE INVENTION

1. Field of the Invention

This invention relates to a vehicle seat component side air bag module having an air bag guide with flexible inner and outer panels having inner extremities secured to a frame of the seat component at spaced locations.

2. Background Art

Vehicle seat components have previously included side air bag modules and conventionally include trim covers that have an air bag release seam through which an air bag upon deployment is projected outwardly from within the seat to provide occupant protection. See, for example, U.S. Pat. No. 5,816,610 Higashiura et al.; U.S. Pat. No. 5,860,673 Hasegawa et al.; and U.S. Pat. No. 5,938,232 Kalandek et al. Different constructions have been utilized to permit passage of the air bag past foam seat padding when inflated by an inflator for movement from within the seat component outwardly through the trim cover release seam. For example, U.S. Pat. No. 6,045,151 Wu discloses a seat pad having a slot through which the air bag moves from an air bag module to the release seam and also discloses a cloth sleeve that extends entirely about the associated air bag module and to the release seam. Also, U.S. Pat. No. 6,237,934 Harrell et al. and U.S. Pat. No. 6,588,838 Dick, Jr. et al., both of which are assigned to the assignee of the present invention, disclose air bag modules wherein the air bag module is located closely adjacent to the release seam to facilitate the air bag deployment.

SUMMARY OF THE INVENTION

An object of the present invention is to provide an improved vehicle seat side air bag module for providing seat occupant protection.

In carrying out the above object, a vehicle seat component constructed in accordance with the invention includes a frame for mounting on an associated vehicle on which the vehicle seat component is to be used, and the frame has opposite lateral sides. A seat pad is mounted by the frame and has a side extremity, and a trim cover extends over the seat pad and has an air bag release seam adjacent the side extremity of the seat pad. An air bag module is mounted on one lateral side of the frame within the trim cover in a spaced relationship from its air bag release seam. The air bag module includes an inflator and an air bag that is inflated by the inflator and projected outwardly from the seat component through the air bag release seam of the trim cover. An air bag guide of the seat component includes an inner panel and an outer panel that are each made of flexible material and have outer and inner extremities with their outer extremities connected to the trim cover adjacent the air bag release seam. The flexible inner and outer panels extend alongside each other from their outer extremities to the air bag module and thence on opposite sides of the air bag module. A first connector secures the inner extremity of the flexible inner panel to the other lateral side of the frame, and a second connector secures the inner extremity of the flexible outer panel to the seat component at the one lateral side of the frame.

The first connector is a taut wire connector for securing the inner extremity of the flexible inner panel to the frame, and the second connector includes a frame connector for securing the inner extremity of the flexible outer panel to the one lateral side of the frame.

The flexible inner panel extends from its outer extremity to the air bag module and thence from the air bag module to the taut wire connector.

The flexible outer panel extends from its outer extremity to the air bag module and thence along the air bag module to its frame connector.

The taut wire connector has a first end secured to the inner extremity of the flexible inner panel adjacent the one lateral side of the frame, and the taut wire connector having has a second end secured to the frame at the other lateral side of the frame. The inner extremity of the flexible inner panel has a connection strip to which the first end of the taut wire connector is secured, and the second end of the taut wire connector has a hooked shape secured to the other lateral side of the frame.

The frame connector includes a hook shaped retainer that secures the inner extremity of the flexible outer panel to the frame. The flexible outer panel and the trim cover extend around the air bag module to the hook shaped retainer for connection to the frame.

The air bag release seam includes stitching through bent seam ends of the trim cover and through the outer extremities of the flexible inner and outer panels.

The vehicle seat component has particular utility as a seat back, especially with its one side extremity at an outboard location to provide protection from adjacent vehicle structure.

The objects, features and advantages of the present invention are readily apparent from the following detailed description of the preferred embodiments when taken in connection with the accompanying drawings.

BRIEF DESCRIPTION OF THE DRAWINGS

FIG. 3a is a partial view illustrating a modification of a trim cover which includes an extension for attachment to a frame of the seat back component.

FIG. 4 is an enlarged view of a portion of FIG. 3 illustrating an air bag release seam of a trim cover of the seat back component.

FIG. 5 is a partial view that illustrates one end of a taut wire connector that secures an inner extremity of a flexible inner panel of an air bag guide of the seat back component.

FIG. 6 is a partial view that illustrates the connection of the other end of the taut wire connector to the frame of the seat back component.

FIG. 7 is a partial view taken along the direction of line 7-7 in FIG. 3 to illustrate securement of an inner extremity of a flexible outer panel of the air bag guide and the trim cover of the seat back component to its frame.

FIG. 8 is a partial sectional view taken along the direction of line 8-8 in FIG. 7 to illustrate the manner in which the inner extremity of the flexible outer panel of the air bag guide is secured to the frame.

FIG. 9 is a partial sectional view taken along the direction of line 9-9 in FIG. 7 to illustrate the manner in which the trim cover is secured to the frame.

DETAILED DESCRIPTION OF THE PREFERRED EMBODIMENT

Figure 1:
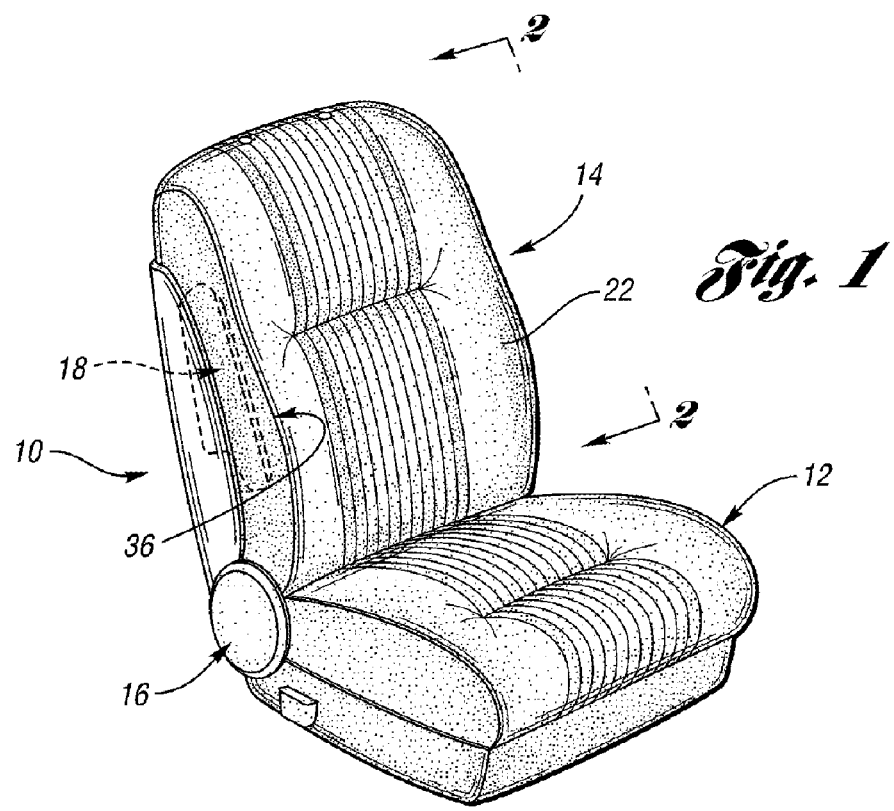
FIG. 1 is a perspective view of a vehicle seat including a seat back component constructed in accordance with the invention to include a side air bag module that is shown by hidden line illustration.
Figure 2:
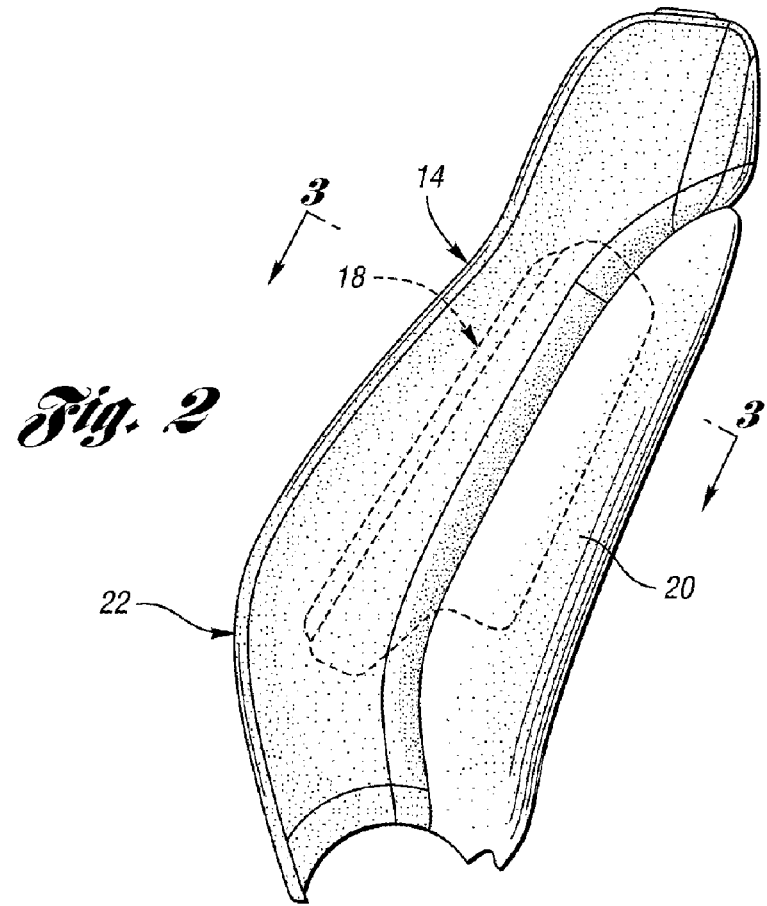
FIG. 2 is a side elevational view of the vehicle seat back component taken along the direction of line 2-2 in FIG. 1 with the side air bag module thereof also illustrated by hidden line representation.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 16. The seat back component 14 includes a side air bag module 18 that is constructed in accordance with the present invention as it is hereinafter more fully described and operable to provide seat occupant protection. While the side air bag module 18 is shown on the seat back 14, which is a usage for which it has particular utility, it is also possible for the side air bag module to be utilized with a seat bottom 12 even though the seat back usage is specifically disclosed. Also, as illustrated, the side air bag module 18 is located at an outboard lateral side or extremity of the seat to provide protection against adjacent vehicle structure, but it is also possible to have the side air bag module located at the inboard lateral side to provide protection against an adjacent vehicle occupant and to also have side air bag modules at both outboard and inboard locations for protection in both lateral directions. As shown in FIG. 2, the seat back 14 includes a back panel 20 that is conventionally molded from plastic and also includes a front cushion 22 against which the seat occupant leans to provide back support and in which the side air bag module 18 is located.

Figure 3:
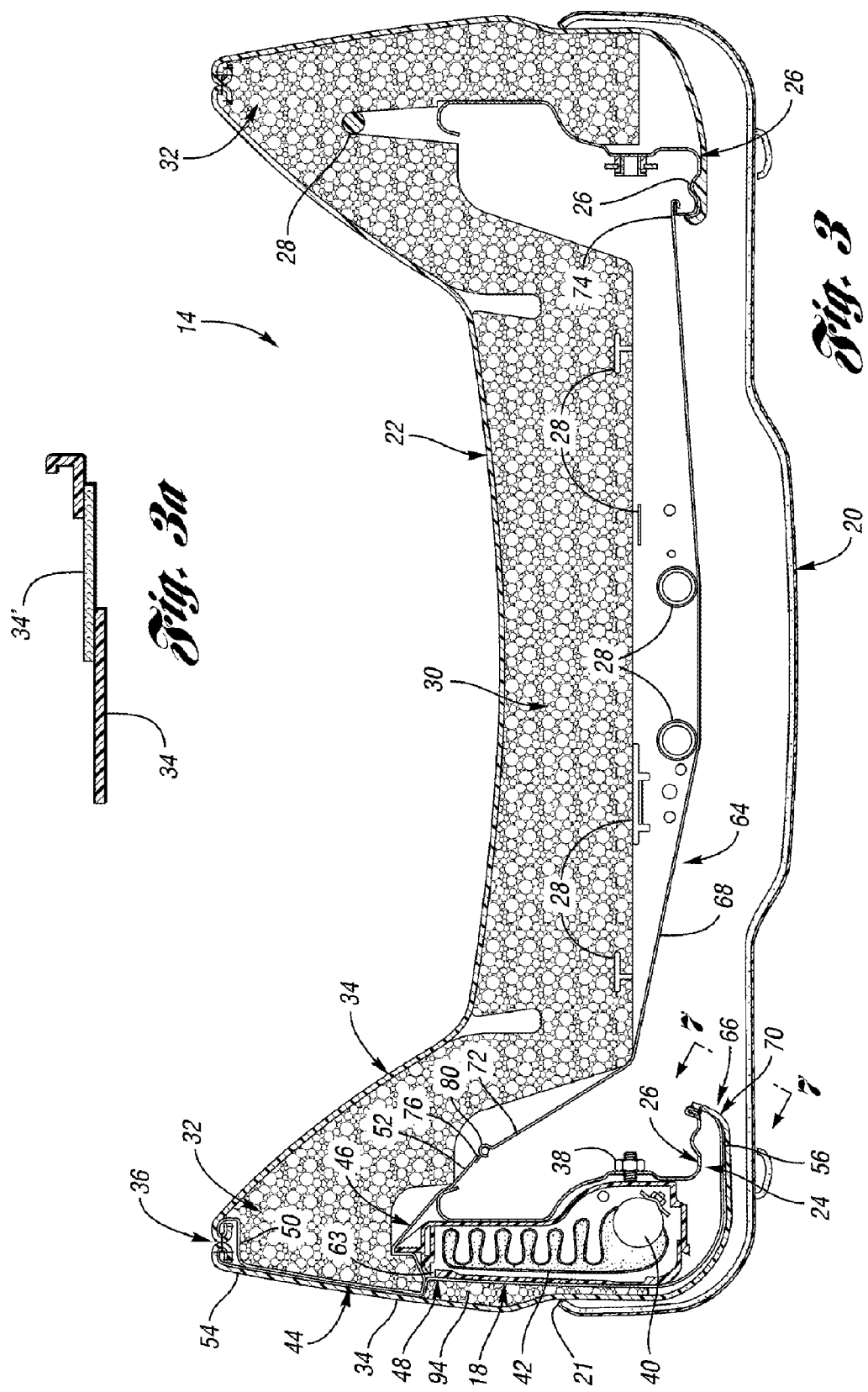
FIG. 3 is a sectional view taken through the seat back component along the direction of line 3-3 in FIG. 2 to further illustrate the construction of the side air bag module within the seat back component.

As shown in FIG. 3, the seat back component 14 includes a frame collectively identified by 24 and having a pair of frame members 26 at its opposite lateral sides as well as having frame tubes and other components all of which are identified by 28. A foam seat pad 30 is mounted on the frame 24 in any conventional manner and has opposite side extremities 32 spaced laterally from each other at the opposite lateral sides of the seat. A trim cover generally indicated by 34 extends over the seat pad 30 and includes an air bag release seam 36 adjacent the left side extremity 32 of the seat pad which, as previously mentioned, corresponds to an outboard location. The side air bag module 18 is located within the trim cover 34 mounted on the frame 24, specifically by a threaded connection 38 on the one side frame member 26 adjacent the air bag release seam 36 but in a spaced relationship from the release seam. The air bag module 18 includes an inflator 40 and a schematically illustrated air bag 42 which may be folded or rolled and, upon deployment, the air bag is inflated by the inflator and projected outwardly from the seat component through the air bag release seam 36 of the trim cover 34.

The trim cover 34 may be made of cloth, vinyl or leather, etc. In some embodiments, the trim cover 34 within the back panel 20 includes an extension 34' secured thereto by stitching and/or adhesive, etc. for securement to the seat component structure as is hereinafter described. Such trim cover extensions can be made of any sufficiently strong and flexible material and can reduce the total cost of the trim cover without losing any aesthetic appeal since the back panel 20 hides the trim cover extension.

With continuing reference to FIG. 3, an air bag guide of the seat back component is generally indicated by 44 and includes an inner panel 46 and an outer panel 48 that are each made of a flexible material such as a suitable cloth. The flexible inner panel 46 has an outer extremity 50 adjacent the air bag release seam 36 and also has an inner extremity 52 as is hereinafter more fully described. The flexible outer panel 48 has an outer extremity 54 adjacent the air bag release seam 36 and has an inner extremity 56 which is hereinafter more fully described.

As shown in FIG. 4, the air bag release seam 36 includes bent seam ends 58 of the trim cover 34 and the outer extremities 50 and 54 of the flexible inner and outer panels 46 and 48. Stitching 60 provides securement of the flexible panel outer extremities 50 and 54 to the trim cover 34 and stitching 62 provides securement of the bent ends 58 to each other.

From the air bag release seam 36 illustrated in FIG. 4, the flexible inner and outer panels 46 and 48 extend alongside each other as shown in FIG. 3 from their outer extremities 50 and 54 to the side air bag module 18 and thence inwardly and outwardly thereof for connection within the seat back component as is hereinafter more fully described. Upon deployment of the side air bag module 18, the air bag 42 moves through a module opening 63 and thence between the flexible inner and outer panels 46 and 48 which then provide a guiding function of the air bag 42 as it moves between the panels toward the air bag release seam 36 and eventually tears open the release seam for outward projection of the air bag to provide the occupant protection. The inner and outer flexible panels 46 and 48 may be made of any suitable flexible material effective to guide the air bag 42 from the module to the release seam. For example, a woven or non-woven cloth material, which may include natural materials or a synthetic material such as nylon. One material that is found to be effective is a polyester material of the type from which the air bag 42 may be manufactured. Regardless of the type of material used to make the air bag guide 44, the use of the air bag guide can be helpful in reducing friction on the air bag 42 as it is deployed. Although a polymer such as nylon may be particularly beneficial, even a fleece material will help reduce the friction on the air bag 42 because the air bag guide 44 prevents contact between the deploying air bag 42 and the seat pad 30.

As illustrated in FIGS. 3, 5 and 6, a first connector collectively indicated by 64 secures the inner extremity 52 of the flexible inner panel 46 to the frame 24 so as to secure the inner panel during the deployment of the air bag as it is inflated by the inflator and guided by the air bag guide as previously described.

As illustrated in FIGS. 3 and 7-9, a second connector collectively indicated by 66 secures the inner extremity 56 of the flexible outer panel 48 to the seat component in a spaced location from the inner extremity of the flexible inner panel. The second connector 66 thus secures the flexible outer panel 48 during the inflating deployment of the air bag as previously described.

Securement of the inner extremities 52 and 56 of the flexible inner and outer members 46 and 48 as described above at spaced locations from each other distributes the loading applied by the air bag guide 44 to the frame during the air bag deployment.

With reference again to FIGS. 3, 5 and 6, the first connector 64 includes a taut wire 68 that secures the inner extremity 52 of the flexible inner panel 46 to the seat back component frame 24.

With reference again to FIGS. 3 and 7-9, the second connector 66 is embodied by a frame connector 70 that secures the inner extremity 56 of the flexible outer panel 48 to the frame 24 in a spaced location from the inner extremity 52 of the flexible inner panel 46 which is likewise secured to the frame as described above.

As previously described in connection with FIG. 3, the flexible inner and outer panels 46 and 48 extend from their outer extremities 50 and 54, respectively, adjacent the air bag release seam 36 of trim cover 34 alongside each other to the air bag module 18. The flexible inner and outer panels 46 and 48 then extend as previously described inwardly and outwardly of the air bag module 18 with the flexible inner panel 46 extending in a skewed angular relationship from the air bag module 18 to the taut wire connector 64. The flexible outer panel 48 extending from its outer extremity separates from the inner panel and extends along the air bag module 18 to its frame connector 70 which is collectively indicated by the first connector 66.

As previously discussed, the seat frame 24 has a pair of opposite lateral sides at which its pair of frame members 26 are respectively located and the air bag module 18 is located adjacent the left outboard side as illustrated in FIG. 3. The taut wire connector 64 has a first end 72 secured to the inner extremity 52 of the flexible inner panel 46 as also shown in FIG. 5 which is adjacent the one lateral side of the frame. From this first end 72, the taut wire connector 64 extends laterally to the other side of the seat back frame and has a second end 74 secured to the frame member 26 at the other lateral side of the frame opposite the side at which the air bag module is located as shown in FIG. 3. As shown in both FIGS. 3 and 5, the inner extremity 52 of the flexible inner panel 46 has a connection strip 76 secured thereto such as by stitching 78 and the first end 72 of the taut wire connector 64 has a hook 80 secured to the connection strip 76. This connection strip 76 may be formed by extrusion from plastic with a web having a web 81 connected to an enlarged bead 82 around which the connector hook 80 extends while projecting through the web. Furthermore, the second end 74 of the taut wire connector 68 has a hook 84 as shown in FIG. 6 to provide a hooked shaped securement to the frame member 26 at the other lateral side of the frame 24. It should be appreciated that one or a plurality of the taut wire connectors can be utilized. Furthermore, the taut wire connector can have different constructions with a number of wires extending parallel to each other or with one or more taut wire connectors having V-shaped configurations extending laterally between the inner extremity of the inner flexible member and the frame.

With reference to FIGS. 5-9, the frame connector 70 has a hook shaped retainer construction including hook shaped retainer portions 86 and 88 that are respectively secured by stitching 90 and 92 or otherwise to the inner extremity 56 of the flexible outer panel 48 and to the inner extremity of the trim cover 34 whether part of the entire trim cover or its extension as previously described in connection with FIG. 3.

As shown in FIG. 3, a foam seat pad portion 94 is located between the flexible outer panel 48 extending along the air bag module 18 and the adjacent portion of the trim cover 34 extending from its exterior location to the edge 21 of the back panel 20. The hook shaped retainer portions 86 and 88 of the hook shaped frame connector 70 alternate with each other as shown in FIG. 7 and permit the inner extremity 56 of the flexible outer panel 48 to be initially secured to the associated frame member 26 of frame 24 prior to the installation of the foam seat pad portion 94 shown in FIG. 3. Thereafter, the trim cover 34 is wrapped around this foam pad portion 94 and its retainer portions 88 are secured to the same frame member 26 of the frame 24 in an alternating relationship with the retainer portions 86 that secure the inner extremity of the flexible outer panel as previously described.

While the side air bag module 18 described above has particular utility for use with a vehicle seat back, especially at its outboard location, it is also possible for the side air bag to be utilized with other vehicle seat components such as with a seat bottom.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat component comprising:
a frame for mounting on an associated vehicle on which the vehicle seat component is to be used, and the frame having opposite lateral sides;
a seat pad mounted by the frame and having a side extremity;
a trim cover extending over the seat pad and having an air bag release seam adjacent the side extremity of the seat pad;
an air bag module mounted on one lateral side of the frame within the trim cover in a spaced relationship from its air bag release seam, and the air bag module including an inflator and an air bag that is inflated by the inflator to project outwardly from the seat component through the air bag release seam of the trim cover;
an air bag guide including an inner panel and an outer panel that are each made of flexible material and have outer and inner extremities with their outer extremities connected to the trim cover adjacent the air bag release seam, the flexible inner and outer panels extending alongside each other from their outer extremities to the air bag module and thence respectively inwardly and outwardly thereof;
a first connector for securing the inner extremity of the flexible inner panel to the other lateral side of the frame; and
a second connector for securing the inner extremity of the flexible outer panel to the seat component at the one lateral side of the frame.

2. A vehicle seat component as in claim 1 wherein: the first connector is a taut wire connector for securing the inner extremity of the flexible inner panel to the other lateral side of the frame; and
the second connector includes a frame connector for securing the inner extremity of the flexible outer panel to the one lateral side of the frame.

3. A vehicle seat component as in claim 2 wherein the flexible inner panel extends from its outer extremity to the air bag module and thence from the air bag module to the taut wire connector.

4. A vehicle seat component as in claim 2 wherein the flexible outer panel extends from its outer extremity to the air bag module and thence along the air bag module to its frame connector.

5. A vehicle seat component as in claim 2 wherein: the flexible inner panel extends from its outer extremity to the air bag module and thence to the taut wire connector; and the flexible outer panel extends from its outer extremity to the air bag module and thence along the air bag module to its frame connector.

6. A vehicle seat component as in claim 2 wherein, the taut wire connector has a first end secured to the inner extremity of the flexible inner panel adjacent the one lateral side of the frame, and the taut wire connector having a second end secured to the frame at the other lateral side of the frame.

7. A vehicle seat component as in claim 6 wherein the inner extremity of the flexible inner panel has a connection strip to which the first end of the taut wire connector is secured, and the second end of the taut wire connector having a hooked shape secured to the other lateral side of the frame.

8. A vehicle seat component as in claim 2 wherein the frame connector includes a hook shaped retainer that secures the inner extremity of the flexible outer panel to the frame.

9. A vehicle seat component as in claim 8 wherein the flexible outer panel and the trim cover extend around the air bag module to the hook shaped retainer for connection to the frame.

10. A vehicle seat component as in claim 2 wherein the air bag release seam includes stitching through bent seam ends of the trim cover and through the outer extremities of the flexible inner and outer panels.

11. A vehicle seat component as in claim 1 embodied as a seat back and wherein the one side extremity is at an outboard location.

12. A vehicle seat back comprising:
a frame for mounting on an associated vehicle on which the vehicle seat back is to be used, and the seat frame having opposite lateral sides;
a seat pad mounted by the frame and having a side extremity adjacent the one lateral side of the frame;
a trim cover extending over the seat pad and having an air bag release seam adjacent the side extremity of the seat pad;
an air bag module mounted on the frame at the one lateral side thereof within the trim cover in a spaced relationship from its air bag release seam, and the air bag module including an inflator and an air bag that is inflated by the inflator to project outwardly from the seat back through the air bag release seam of the trim cover;
an air bag guide including an inner panel and an outer panel that are each made of flexible material and have outer and inner extremities with their outer extremities connected to the trim cover adjacent the air bag release seam, the flexible inner and outer panels extending alongside each other from their outer extremities to the air bag module and thence on opposite sides of the air bag module;
a taut wire connector having a first end that secures the inner extremity of the flexible inner panel to the frame adjacent the other lateral side of the frame, and the taut wire connector having a second end secured to the frame at its other lateral side; and
a frame connector for securing the inner extremity of the flexible outer panel to the one lateral side of the frame.

* * * * *